C. H. MARSHALL.
TRUNDLE TURN TABLE.
APPLICATION FILED AUG. 10, 1915.
1,187,358.
Patented June 13, 1916.
3 SHEETS—SHEET 2.
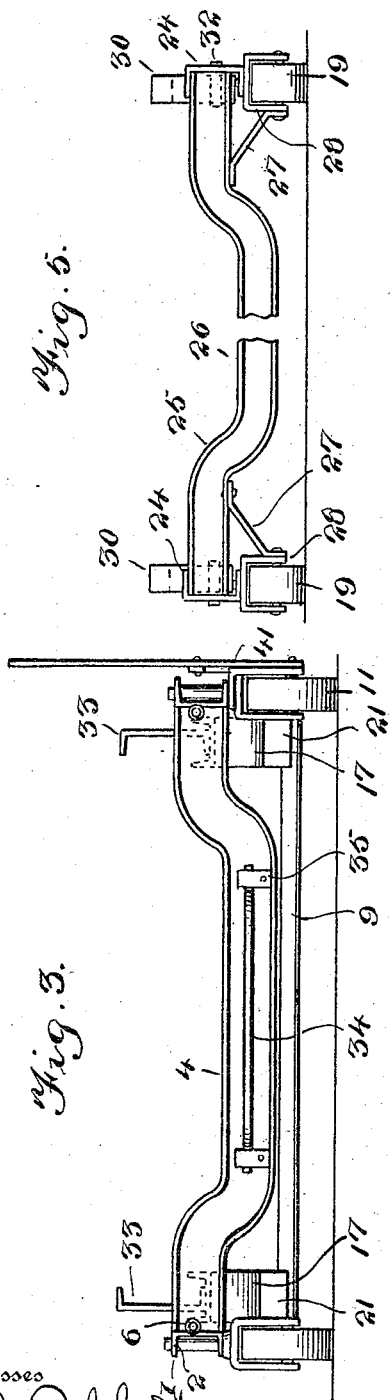
Inventor
C. H. Marshall
By Victor J. Evans
Attorney
Witnesses

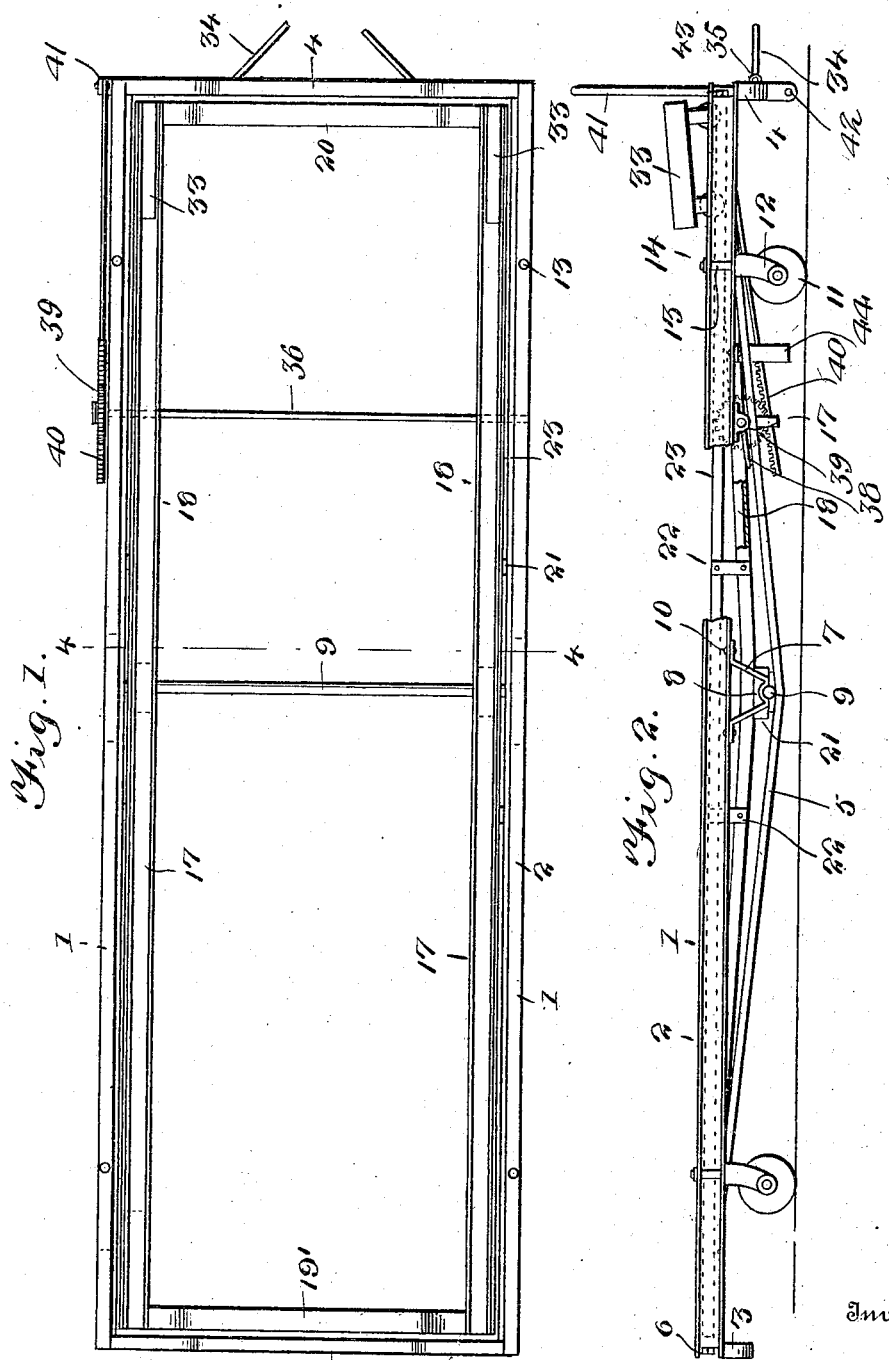

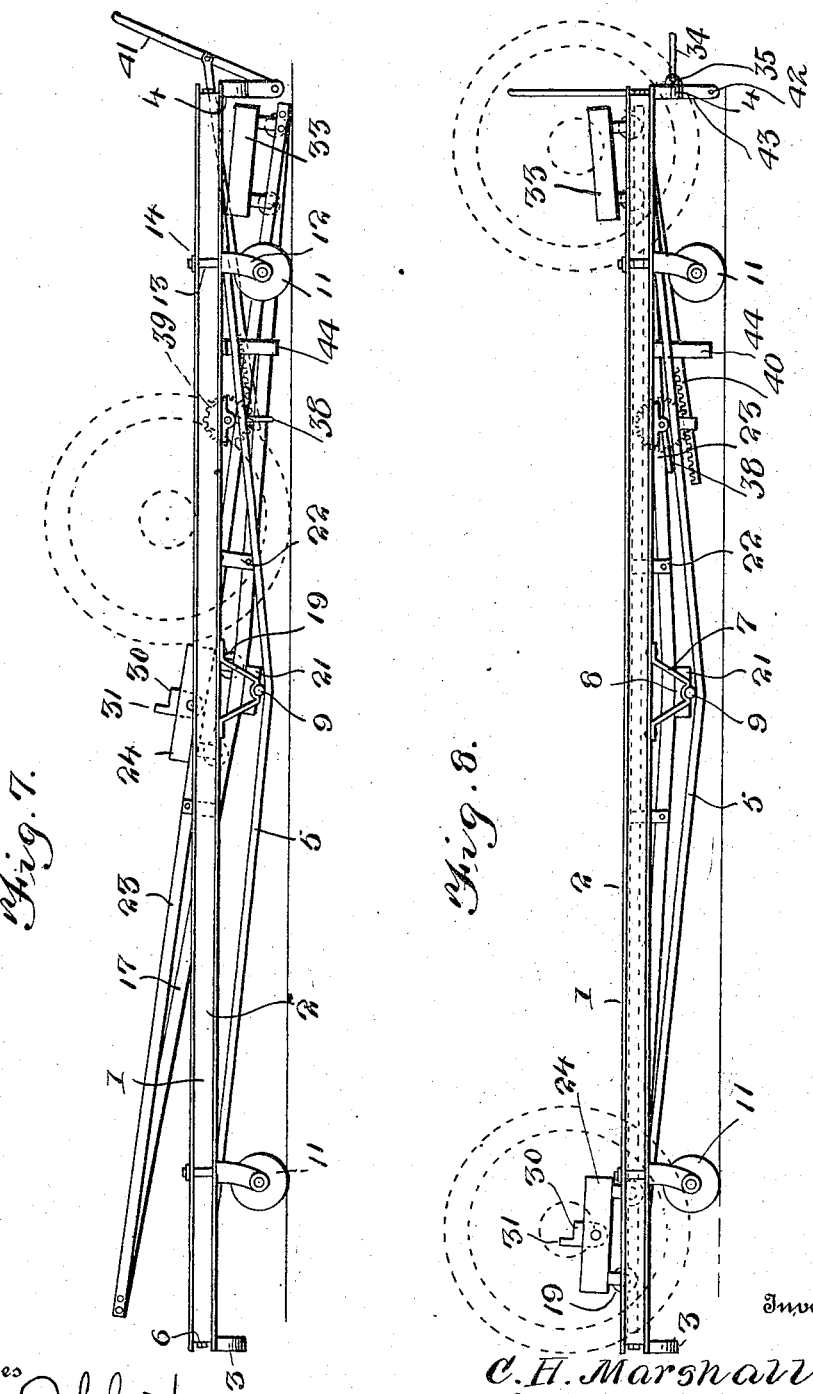

UNITED STATES PATENT OFFICE.

CHARLES H. MARSHALL, OF CLAYTON, ILLINOIS.

TRUNDLE TURN-TABLE.

1,187,358.   Specification of Letters Patent.   Patented June 13, 1916.

Application filed August 10, 1915. Serial No. 44,809.

*To all whom it may concern:*

Be it known that I, CHARLES H. MARSHALL, a citizen of the United States, residing at Clayton, in the county of Adams and State of Illinois, have invented new and useful Improvements in Trundle Turn-Tables, of which the following is a specification.

This invention relates to trundle turn tables designed for the special purpose of conveniently and expeditiously handling automobiles and other wheeled vehicles, the object in view being to produce a device adapted to support a wheeled vehicle with the wheels thereof out of contact with the ground or floor and also adapted to be used as a turn table to facilitate the turning of automobiles and other vehicles while the wheels thereof are out of contact with the supporting surface.

With the above and other objects in view, the invention consists in the novel construction, combination and arrangement of parts as herein described, illustrated and claimed.

In the accompanying drawings:—Figure 1 is a plan view of the trundle turn table of this invention. Fig. 2 is a side elevation of the same partly in section. Fig. 3 is an end elevation thereof. Fig. 4 is a vertical cross section on the line 4—4 of Fig. 1. Fig. 5 is a side elevation of the carriage. Fig. 6 is an end elevation thereof. Fig. 7 is a side elevation of the device showing the tilting frame inclined and receiving an automobile. Fig. 8 is a similar view showing the final position of the parts with the wheels of an automobile clear of the supporting surface. Fig. 9 is a fragmentary section showing the elevating crank shaft and operating means therefor.

The main frame of the machine comprises the longitudinal side bars 1 which are preferably of channel iron with the flanges 2 thereof turned outwardly, said side bars being connected at their front and rear ends of the channel iron cross bars 3 and 4 respectively having their flanges turned outwardly, all of said bars 1, 3 and 4 being firmly and rigidly united at the corners of the main frame.

5 designates a pair of truss rods the opposite extremities of which are fastened at 6 to the corners of the frame, the central portions of said truss rods being depressed and held by oppositely arranged studs 7 shown as substantially of V-shape with the lower ends or vertices thereof arched as at 8 to partially embrace a cross shaft 9 beneath which the truss rods 5 pass as clearly indicated in Fig. 2. The studs 7 are fastened at 10 to the side bars 1 of the frame and said studs together with the cross shaft 9 are located nearer to the receiving end of the main frame than the opposite or rear end thereof for a purpose which will presently appear. The main frame is supported adjacent to the opposite ends thereof by rollers or caster wheels 11 each of which comprises a frame 12 having a vertical spindle 13 which is journaled in a bearing 14 in one of the side bars of the main frame. Within the main frame there is mounted a tilting frame comprising the parallel side bars 17 which are formed of channel iron with the flanges 18 thereof turned upwardly to form guard rails for the supporting rollers or wheels 19 of the carriage hereinafter more particularly described. The roller supporting guide rails 17 are parallel to each other and are shown as rigidly fastened together by means of front and rear cross bars 19' and 20, respectively. The tilting frame is provided with downwardly extending rockers 21 which rest and turn partially upon the cross shaft 9 to admit of the rocking movement of the tilting frame. The guide rails 17 incline downwardly from their opposite ends to a point adjacent to the cross shaft 9 and may be supported at any desired number of intervals by means of hanger straps 22 fastened at their lower ends to said guide rails 17 and at their upper ends to track supporting bars 23 extending longitudinally of the tilting frame thus producing a tilting frame of strong construction adapted to support an automobile of any desired weight and size.

The carriages, one of which is best illustrated in Figs. 5 and 6, in the preferred embodiment thereof, each comprises a substantially rectangular frame embodying the end channel bars 25 the flanges of which are shown as turned inwardly, said bars being connected by cross bars 24 also shown as formed of channel iron with the flanges thereof turned inwardly toward each other. The central portions of the bars 25 are depressed or dropped as indicated at 26 to provide clearance for an automobile as it is driven upon the carriage and turn table, 27 designating corner braces connecting the bars 26 to the forks or frame 28 in which the supporting rollers or wheels 19 are journaled on the axles 29. Connected to the end bars 24 of one carriage is an axle rest and stop 30 provided with an upwardly extending stop shoulder 31. The stop or rest is pivoted at 32 to the respective end bar 24 of the carriage, any suitable means may be employed for holding the stop in the position illustrated in Fig. 6 and also for permitting said stop to be turned downwardly for the purpose of facilitating the removal of an automobile from the turn table. The rear axle of the machine is brought to place on the rests or stops 30 of the carriage after the carriage has been propelled sufficiently toward the rear of the turn table to bring the front axle over the other carriage 33. At one end the main frame is provided with a bail-shaped trundle handle bar 34 the extremities of which are pivotally received in straps or keepers 35 on one of the end cross bars of the frame.

In order to raise and lower the receiving end of the tilting frame and in order to enable the automobile to be discharged from either end of said frame, I employ a crank shaft 36 which is best illustrated in Fig. 9, said shaft being journaled in bearings 37 on the main frame and provided with a pair of cranks 38 which extend under the channel irons 17. At one end the shaft 36 has fast thereon a spur gear wheel 39 which meshes with and is actuated by a rack bar 40 connected at one end to a hand lever 41, the latter being fulcrumed at 42 on a bracket 43 extending below the frame as shown.

44 designates a stop in the form of a stirrup which serves to limit the downward movement of the receiving end of the tilting frame to prevent said end of the frame from coming in contact with the floor or supporting surface.

When the machine is upon the tilting frame with the axles thereof resting on the carriages hereinabove described, and the machine is virtually balanced on the shaft 9 as a center, the operator by then manipulating the lever 41 may raise the receiving end of the tilting frame or allow the same to be moved downwardly and by means of said lever 41 he may control the angle of the tilting frame so that the automobile may be removed from the device at either end thereof.

The operation of the trundle turn table is as follows: The machine is driven rearwardly so as to straddle the turn table as a whole. When the rear axle of the machine has reached a point slightly beyond the center of the main frame, it engages the rests or stops of the carriage and thereupon the carriage is propelled along the rear inclined portions of the guide rails. When the carriage has proceeded a certain distance, the front axle arrives at a point over the carriage 33. Thereupon the tilting frame is rocked to a substantially horizontal position as shown in Fig. 8, the front axle being elevated by the carriage 33 and the rear axle being sustained in an elevated position by the rests 30 of the carriage at that end of the frame. This brings all of the wheels of the automobile clear of the ground. After this, the turn table may be turned or trundled to any desired point in a garage or storage room thereby greatly facilitating the handling of automobiles and similar vehicles in garages, ware houses, display rooms, factories and the like.

What I claim is:

1. A trundle turn table embodying a main frame, supporting rollers for said frame, a tilting frame supported between its ends by said main frame, and a carriage movable along said tilting frame.

2. A trundle turn table embodying a main frame, supporting rollers for said frame, a tilting frame supported between its ends by said main frame and comprising parallel inclined track rails, and a carriage movable along the track rails of said tilting frame.

3. A trundle turn table embodying a main frame, supporting rollers for said frame, a tilting frame supported between its ends by said main frame nearer to one end of the latter than the other end thereof, and a carriage movable along said tilting frame.

4. A trundle turn table embodying a main frame, supporting rollers for said frame, a tilting frame supported between its ends by said main frame, and a carriage movable along said tilting frame and comprising supporting rollers and a carriage frame having a cross bar depressed between the ends thereof.

5. A trundle turn table embodying a main frame, supporting rollers for said frame, a tilting frame supported between its ends by said main frame, an axle supporting carriage movable along said tilting frame, and another axle carriage on the receiving end of the tilting frame.

6. A trundle turn table embodying a main frame, supporting rollers for said frame, a tilting frame supported between its ends by said main frame, a carriage movable along said tilting frame, and manually operable means for rocking said tilting frame.

7. A trundle turn table embodying a main frame, supporting rollers for said frame, a tilting frame supported between its ends by said main frame, a carriage movable along said tilting frame, and depressible axle stops on said carriage.

8. A trundle turn table embodying a main frame, supporting rollers for said frame, a tilting frame supported between its ends by said main frame, a cross shaft forming the fulcrum on which said tilting frame rocks, and a carriage movable along said tilting frame.

In testimony whereof I affix my signature in presence of two witnesses.

CHARLES H. MARSHALL.

Witnesses:
JAS. R. MOFFETT,
JOHN R. WALLACE.